US005279696A

United States Patent [19]

Zangenfeind et al.

[11] Patent Number: 5,279,696

[45] Date of Patent: Jan. 18, 1994

[54] APPARATUS FOR READING AND PROCESSING ENCODED INFORMATION OF UNITING BANDS FOR WEBS OF PHOTOGRAPHIC MATERIAL

[75] Inventors: Helmut Zangenfeind, Puchheim; Günther Schölch; Reinhart Würfel, both of Munich; Rainer Türcke, Taufkirchen, all of Fed. Rep. of Germany

[73] Assignee: AGFA-Gevaert Aktiengesellschaft, Leverkusen, Fed. Rep. of Germany

[21] Appl. No.: 415,177

[22] Filed: Sep. 29, 1989

[30] Foreign Application Priority Data

Oct. 1, 1988 [DE] Fed. Rep. of Germany ....... 3833468

[51] Int. Cl.[5] .............................................. B32B 31/00

[52] U.S. Cl. .................................... 156/354; 156/353; 156/361; 156/502; 156/540; 156/541; 156/542; 156/553; 156/581; 156/583.4

[58] Field of Search ................. 156/502, 505, 506, 64, 156/157, 540, 541, 542, 361, 362, 363, 353, 354, 355, 553, 581, 583.4, 582

[56] References Cited

U.S. PATENT DOCUMENTS

Re. 28,732 3/1976 von Hofe ........................ 156/354 X
3,779,837 12/1973 Zahn et al. ........................ 156/506 X
3,954,542 5/1976 Solomon et al. ............... 156/363 X
4,046,614 9/1977 Zahn et al. ........................... 156/353
4,073,588 2/1978 Zangenfeind et al. ................ 355/41
4,080,242 3/1978 Komenda et al. .................. 156/506
4,115,981 9/1978 Hell et al. ................................ 53/55
4,397,709 8/1983 Schwenzer ..................... 156/361 X
4,403,465 9/1983 Bachner ................................ 53/477
4,732,278 3/1988 Zangenfeind et al. .............. 209/546

FOREIGN PATENT DOCUMENTS 0212134 3/1987 European Pat. Off. .

*Primary Examiner*—David A. Simmons
*Assistant Examiner*—J. Sells
*Attorney, Agent, or Firm*—Peter K. Kontler

[57] ABSTRACT

Uniting bands in the form of heat-sealable labels which bear encoded information are applied to exposed photographic films to join the films end-to-end. The encoded information is decoded by a reader before the labels are applied to the films to thus ensure that the hot sealing member which is used to apply labels cannot destroy or distort encoded information prior to decoding. Decoded information is used for the application of corresponding information to envelopes for exposed and developed films and for the prints of images of the respective film frames.

16 Claims, 3 Drawing Sheets

APPARATUS FOR READING AND PROCESSING ENCODED INFORMATION OF UNITING BANDS FOR WEBS OF PHOTOGRAPHIC MATERIAL

BACKGROUND OF THE INVENTION

The invention relates to a method of and to an apparatus for manipulating webs of photographic material, and more particularly to improvements in methods of and in apparatus for splicing webs of photographic material end-to-end by means of uniting bands in the form of labels which are provided with encoded information. Still more particularly, the invention relates to a method of and to an apparatus for joining the webs end-to-end by means of labels and for applying decoded information to other objects, particularly to envelopes for exposed and developed photographic films and accompanying prints.

Published European patent application No. 0 212 134 discloses a method of joining webs of photographic material end-to-end by means of labels which are provided with encoded information denoting serial numbers or customer numbers. The labels are applied to the trailing ends of successive films of a long series of films and to the leaders of next-following films so that each label establishes a splice between the respective films. Information which is encoded on the labels is decoded subsequent to application of labels to the films, and the thus decoded information is transmitted to a printer or perforator which applies the same information to a customer envelope, namely an envelope which is to receive the respective film and the corresponding prints. The strip of coherent films which are joined by labels is transported through a developing machine and thereupon through a printer which makes reproductions of images of film frames on photographic paper. Such reproductions must be introduced into envelopes, together with the respective films. The application of decoded information to envelopes (normally again in encoded form) is intended to ensure that each envelope will receive a proper film and the corresponding prints.

As a rule, the labels are sealed to the films by heat. This creates problems because the encoded information is often distorted as a result of heating so that it cannot be readily decoded or is decoded in a misleading way. For example, the bars of a bar code are likely to be distorted to such an extent that the information cannot be decoded at all or, if decoded by a standard reader, the decoded information is misleading and can cause introduction of exposed and developed films and corresponding prints into wrong envelopes to be a cause of numerous customer complaints. Distortion of a single bar of a bar code can cause the application of an incorrect serial number, order number or customer number to an envelope with the aforedescribed consequences.

Monitoring of decoded information can result in detection of incorrect information on the envelopes. However, the steps of correcting the error are time-consuming and necessitate a lengthy interruption of the normally fully automated operation. The main reason is that the labels with distorted information thereon are already applied to the films and removal of labels with distorted information thereon is a time-consuming operation which often entails damage to the films. The removed label must be replaced with a fresh label which involves additional expenditures in time.

OBJECTS OF THE INVENTION

An object of the invention is to provide a novel and improved method of joining webs of photographic material end-to-end by means of labels or uniting bands which are provided with encoded information without affecting the quality, particularly the readability, of encoded information.

Another object of the invention is to provide a method which ensures that information which is encoded on the labels is identical with information which is applied to the corresponding envelopes.

A further object of the invention is to provide a novel and improved method of preventing damage to heat-sensitive labels preparatory to and during application of labels to webs of photographic material.

An additional object of the invention is to provide a method which reduces the likelihood of interruptions of automated processing of exposed photographic films in a processing laboratory.

Still another object of the invention is to provide a method which can be practiced with available labels.

A further object of the invention is to provide an apparatus which can be utilized for the practice of the above outlined method.

An additional object of the invention is to provide the apparatus with novel and improved means for supporting and moving a reader of encoded information.

A further object of the invention is to provide an apparatus wherein the encoded information cannot or is unlikely to be distorted or destroyed prior to decoding.

SUMMARY OF THE INVENTION

One feature of the present invention resides in the provision of a method of joining successive discrete elongated webs of photographic material (e.g., exposed photographic roll films) end-to-end by means of labels which bear encoded information. The improved method comprises the steps of advancing successive webs of the series longitudinally and preferably stepwise along a predetermined path so that the trailing ends of successive webs are adjacent (and can actually abut but preferably do not overlap) the leaders of next-following webs in a predetermined portion of the path, affixing labels to the trailing ends of successive webs and to the leaders of the next-following webs in the predetermined portion of the path to thus convert the discrete webs into a strip of coherent webs, and decoding the information on the labels prior to the affixing step, i.e., before such information can be affected by the affixing step.

The method preferably further includes the step of applying decoded information to successive envelopes for webs of photographic material and for prints or analogous reproductions of images on the respective webs.

The method preferably also includes the step of transporting a succession of labels in a predetermined direction along a second path toward the predetermined portion of the predetermined path. The decoding step then preferably takes place in the second path ahead of the predetermined portion of the predetermined path.

The encoded information preferably includes parallel bars, and such bars preferably extend in the predetermined direction. The decoding step then preferably includes moving a reader of bar codes substantially transversely of the second path.

The decoding step preferably includes repeatedly reading information on successive labels in the second path. The transporting step of such method preferably includes moving the labels along the second path in the course of each decoding step so that each of the repeated readings of information on a label takes place in a different position of such label relative to the second path. This enhances the reliability of the decoding operation, and the reading of information on each label can be repeated a predetermined maximum number of times or until an evaluating circuit ascertains that the decoded information is sufficiently clear and unequivocal to warrant the application of corresponding information to an envelope, e.g., to a customary envelope having a first pocket for sections of an exposed and developed roll film and a second pocket for prints of images on the frames of such film.

The labels can consist of or can be provided with layers of heat-sealable material, the same as the webs. The affixing step then preferably includes securing labels to the respective webs as a result of the application of pressure and/or heat. Such method can further comprise the step of moving the labels of the succession of labels along the second path counter to the predetermined direction subsequent to each securing step to prevent over-heating of the foremost label in the second path during advancement of the preceding label along the first path.

The labels in the second path preferably form a train of coherent labels and each such label preferably bears additional information in a predetermined position with reference to the corresponding encoded information. The method can further comprise the steps of monitoring the labels in the second path, generating signals in response to detection of additional information on successive labels of the train of labels, and utilizing the signals to separate successive foremost labels from next-following labels of the train upon entry of successive foremost labels into the predetermined portion of the predetermined path.

Another feature of the invention resides in the provision of an apparatus for joining successive webs of a series of discrete elongated webs of photographic material end-to-end by means of labels bearing encoded information. The improved apparatus comprises means for advancing successive webs of the series along a first path so that the trailing ends of successive webs are adjacent the leaders of next-following webs of the series in a predetermined portion of the first path, means (e.g., a heated sealing member) for affixing labels to the trailing ends of successive webs and to the leaders of next-following webs in the predetermined portion of the first path, and means for decoding information on the labels prior to affixing the labels to the webs. The apparatus further includes a source of supply of envelopes, one for each label and for one of the webs which are joined to each other by the respective label, and a printer or other suitable means for applying decoded information to the respective envelopes.

The apparatus preferably further comprises means for transporting a succession of labels (particularly a train of coherent labels) along a second path in a predetermined direction toward the predetermined portion of the first path. The decoding means is adjacent the second path. The transporting means preferably includes means for transporting or conveying the labels in stepwise fashion, and means for guiding the labels in the second path. The decoding means can comprise a reader of encoded information (such as a bar code reader), and means for moving the reader substantially transversely of the second path. If the encoded information is in the form of parallel bars, such bars extend in the direction of transport of labels along the second path. The means for moving the reader substantially transversely of the second path (i.e., substantially transversely of the bars of codes on the labels in the second path) is preferably designed to move the reader in substantial parallelism with the plane of labels in the second path, i.e., along a third path which is or can be substantially parallel to the plane of labels in the second path or at least to the plane of that label which is in the range of the reader.

The means for moving the reader can include an elongated arm which is pivotable about an axis extending in substantial parallelism with the direction of advancement of labels along the second path, and means for pivoting the arm back and forth. The reader is provided on the arm, preferably at a considerable distance from the pivot axis so that the third path has a large radius of curvature. The pivoting means can include means (e.g., a fluid-operated cylinder and piston unit) for turning the arm in a first direction (e.g., clockwise), and means (e.g., a spring) for turning the arm in a second direction counter to the first direction. The reader is preferably designed to read encoded information on the adjacent label during movement in the first and second directions.

The apparatus can further comprise means for operating the transporting means so as to transport the labels along the second path during or subsequent to each change of direction of turning of the arm about its axis. For example, the transporting means can be operated to transport the labels through increments of one or more millimeters or one or more fractions of a millimeter during or subsequent to each change in direction of turning of the arm. This ensures that encoded information in the range of the reader is moved relative to the reader prior to or subsequent to each pas. Such mode of reading encoded information is more likely to furnish at least one reading which is highly reliable, i.e., which is truly indicative of decoded information on the label within the range of the oscillating reader.

The transporting means can include a reversible electric motor or other suitable means for conveying or transporting labels in and counter to the direction toward the predetermined portion of the first path. This is desirable if the affixing means includes means for heating the labels and if excessive and prolonged heating of a label could affect the readability of encoded and/or other information on a label at the affixing station in the predetermined portion of the first path. The apparatus then further comprises means for operating the conveying means to move the labels counter to the direction toward the predetermined portion of the first path in order to move the foremost label in the second path away from the affixing means during advancement of a freshly affixed label away from the predetermined portion of the first path, i.e., when the advancing means is in operation to move the trailing end of the last web of the strip of coherent webs and the leader of the next-following web into the range of the affixing means in the predetermined portion of the first path.

If the labels in the second path together form a train of coherent labels, the apparatus further comprises severing means which is operable to separate (e.g., cut or tear) successive labels from next-following labels of the train upon entry of foremost labels into the predetermined portion of the first path. The aforementioned means for operating the conveying means is preferably arranged to operate the conveying means so as to move the train of labels counter to the direction of advancement toward the affixing means upon separation of successive foremost labels. This ensures that the foremost label of the train in the second path is not affected by heat which is radiated by the affixing means. The conveying means can be designed to move the train of labels counter to the direction of transport toward the affixing means through distances in the range of one or more centimeters or fractions of one centimeter, depending upon the temperature of affixing means and/or upon the nature of labels, i.e., the influence of heat upon information on the labels and/or upon other desirable characteristics of the labels.

The labels can bear additional (encoded or unencoded) information, particularly information denoting the distance of additional information from the front ends of the respective labels (as seen in the direction of movement toward the affixing means). A suitable detector can be placed adjacent the second path to generate signals in response to detection of additional information on successive labels of the train of labels in the second path, and such signals can be used to operate the aforementioned severing means to separate successive foremost labels from next-following labels of the train of labels when the foremost labels enter the predetermined portion of the first path and are in optimum positions for affixing to a pair of webs in the first path.

A discrete second detector can be installed adjacent the second path to monitor the front ends of successive foremost labels and to generate signals which are transmitted to the means for transporting the labels along the second path.

The affixing means can include a heated sealing member having a label-contacting sealing or affixing surface and at least one recess in such surface. The position of the recess is selected with a view to ensure that encoded information on a label in the predetermined portion of the first path is overlapped by (i.e., it registers with) the recess so that the hot surface of the sealing member does not directly contact that portion of the label which bears encoded information. Such design of the sealing member is particularly desirable if the encoded information is in the form of a bar code the bars of which could be distorted to furnish misleading information, or information which cannot be read at all, if the respective portion of the label in the predetermined portion of the first path is overheated.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
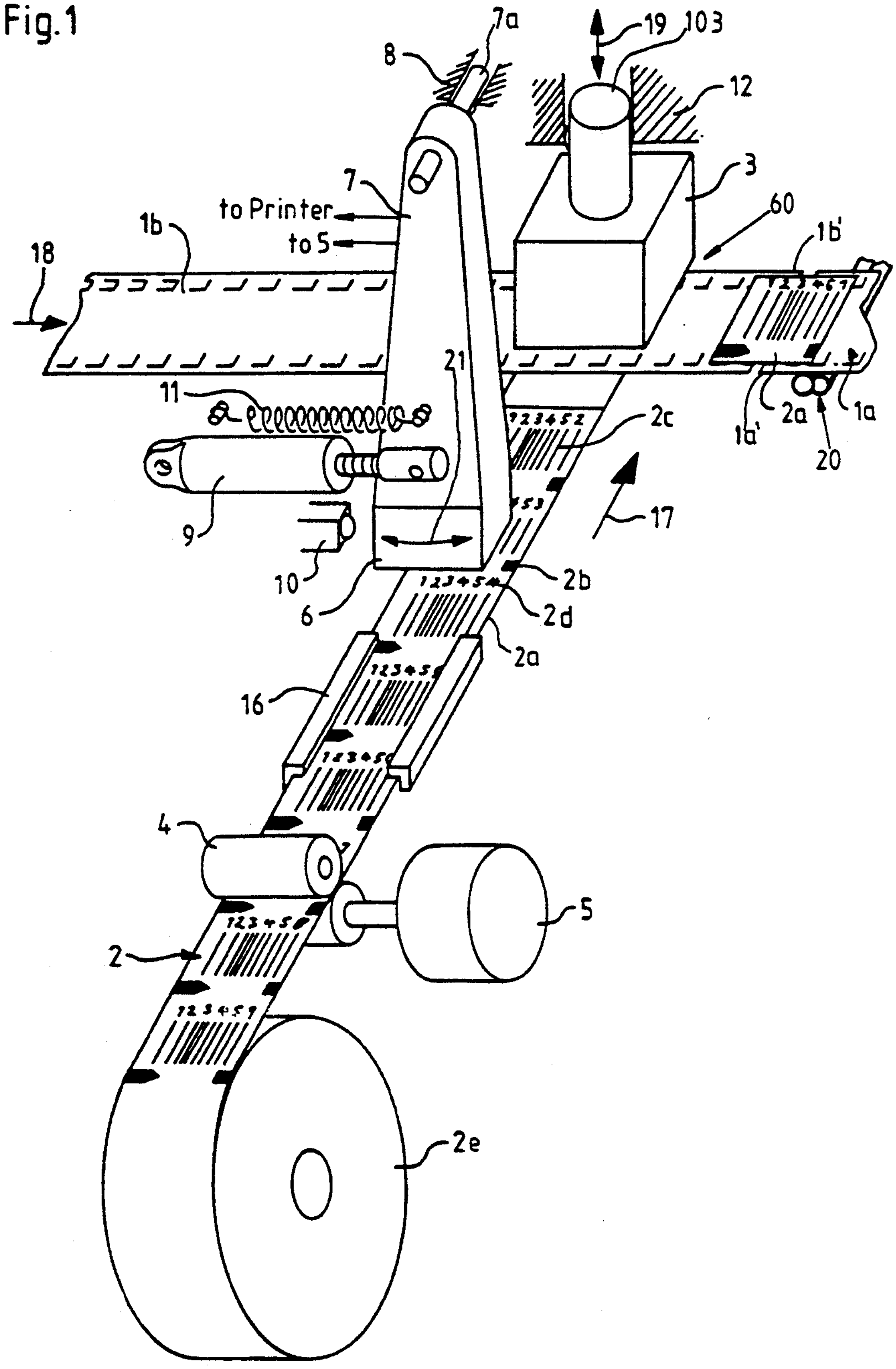
FIG. 1 is a fragmentary schematic perspective view of an apparatus which embodies one form of the present invention, two freshly joined webs being shown in the process of moving away from the predetermined portion of the first path and the train of labels in the second path being shown in retracted position in which the foremost label of the train is spaced apart from the heated sealing member of the affixing means.

FIG. 1 shows a portion of an apparatus which embodies the invention. The apparatus comprises a web advancing unit including several sets of intermittently driven rolls 20 (only one set is shown) serving to advance a series of successive exposed photographic films (including the illustrated films 1*a* and 1*b*) along a first path in the direction of arrow 18. The operation of the advancing unit is such that the trailing end (1*a'*) of each preceding film (1*a*) is adjacent and disposed substantially end-to-end with the leader (1*b'*) of the next-following film (1*b*) of the series of films not later than at a splicing station 60 in a predetermined portion of the path for the films.

The means for splicing successive films to each other end-to-end includes uniting bands 2*a* in the form of labels each of which bears encoded information 2*c* in the form of a bar code. The labels 2*a* are sealable to the respective films by heat so that the thus spliced-together films form a strip of coherent films ready to be convoluted onto the core of a reel for transport to a developing machine where the films are developed prior to being introduced into a printing or copying machine for the making of prints of images of their frames in a manner not forming part of the present invention.

Each label 2*a* further carries unencoded information 2*d*, e.g., in the form of numerals and corresponding to encoded information 2*c*. The encoded information 2*c* is in the form of a bar code with bars extending in the direction of transport (arrow 17) of successive labels 2*a* toward and into the splicing station 60. In other words, the bars of the bar codes extend at right angles to the direction (arrow 18) of advancement of films 1*a*, 1*b* along their (first or predetermined) path.

The labels 2*a* which are to be affixed to successive pairs of films at the splicing station 60 form an elongated train or chain 2 of coherent labels. The train 2 is supplied by a reel 2*e*, and that portion of the train which is unwound is located in a predetermined plane, namely in a plane which coincides with or is closely adjacent the plane of the films 1*a*, 1*b* at the splicing station 60. The means for transporting the train 2 of labels 2*a* toward the splicing station 60 comprises a conveyor including two advancing rolls 4 one of which is driven by a reversible electric motor 5 and the other of which is biased toward the one roll in the customary way so that the label 2a in the nip of the rolls 4 is caused to advance in the direction of arrow 17 as soon as the motor 5 is started in a direction to advance the labels toward the splicing station 60.

The labels 2a which advance in the direction of arrow 17 are confined to movement in a predetermined second path by suitable guide means 16 which extends all the way to the station 60 but is partly broken away in FIG. 1 for the sake of clarity.

The labels 2a of the train 2 of labels are separable from each other along transversely extending weakened portions 2f (FIG. 4) which can include rows of perforations. Each label 2a further carries additional encoded information 2b in a predetermined position relative to the respective encoded information 2c. The information 2b serves to enable a reflection type photoelectronic detector 15 to generate signals which are used to actuate a severing device 13 (FIG. 3) in order to sever the train 2 of labels 2a along a weakened portion 2f and to thus separate the foremost label from the next-following label of the train as soon as the foremost label reaches the splicing station 60. The detector 15 can further serve to transmit a signal to the motor 5 so that the latter is started in reverse and moves the foremost labels 2a of the remainder of the train 2 counter to the direction of arrow 17. This reduces the likelihood of overheating of the foremost label 2a of the train 2 of labels while the foremost label is adjacent the station 60 and a heated affixing device or sealing member 3 at the splicing station 60 is in the process of bonding a freshly separated label 2a to the films 1a and 1b. Moreover, the foremost label 2a of the train 2 is preferably maintained in retracted position during advancement of films 1a, 1b by the rolls 20 in order to move the trailing end of the film 1b and the leader of the next-following film (not shown) into proper positions for attachment of the next label 2a thereto.

The additional information 2b can be applied to labels 2a simultaneously with encoded information 2c and preferably by using the same type of ink. A marker 2g is applied to each label 2a in a predetermined position relative to the respective information 2b, 2c and/or 2d or in a predetermined position relative to the front or rear end of the respective label 2a. The illustrated markers 2g are in line with and have tips pointing toward the respective additional encoded information 2b. The information 2b and the markers 2g are applied to different marginal portions of the train 2 of labels 2a.

The means for decoding the information 2c on successive labels 2a in the path which is defined by the guide means 16 includes a standard bar code reader 6 (FIG. 1) and means for moving the reader back and forth across the path for the labels. The moving means includes a relatively long arm 7 which is turnable about the axis of a pivot member 7a mounted in a fixed bearing 8, a pneumatic or hydraulic cylinder and piston unit 9 which can turn the arm 7 in a counterclockwise direction, and a coil spring 11 which can turn the arm in a clockwise direction. The extent of pivotability of the arm 7 under the action of the coil spring 11 is limited by a suitable stop 10. The reader 6 can be of the type known as F30 Infrarot which is produced by Data Logic.

The arm 7 is preferably long so as to ensure that the slightly arcuate (third) path of pivotal movement of the reader 6 transversely of the path of movement of labels 2a on their way toward the splicing station 60 is substantially parallel to the plane of labels 2a in the guide means 16. This enhances the accuracy of the decoding operation.

The sealing member 3 is installed at the splicing station 60 and is movable up and down away from and toward the label 2a which overlies the trailing end of the right-hand film and the leader of the left-hand film at this station. The sealing member 3 has an extension 103 which is reciprocably guided in a stationary bearing 12. The means for reciprocating the sealing member 3 in directions which are indicated by arrow 19 is not specifically shown in the drawing; such reciprocating means can comprise a hydraulic or pneumatic cylinder and piston unit, a rack and pinion drive or the like.

The width of the sealing member 3 in the direction of arrow 17 equals or approximates the width of the film 1a or 1b, and the length of the sealing member 3 in the direction of arrow 18 at least equals but can exceed the width of a label 2a. The sealing member 3 can be maintained at an optimum sealing temperature by an adjustable electric resistance heater or the like, not shown.

Figure 2:
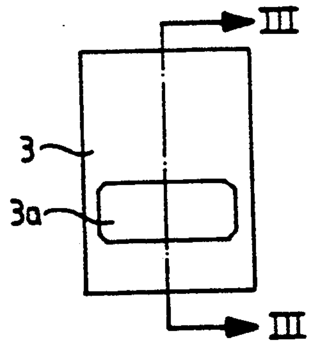
FIG. 2 is a bottom plan view of the sealing member.

The label-contacting surface at the underside of the sealing member 3 is provided with at least one recess 3a (see FIGS. 2 and 3) which is in register with (i.e., which overlies) the encoded information 2c on the label 2a at the splicing station 60. This reduces the likelihood of distortion of such encoded information during splicing of neighboring films end-to-end. The recess 3a can be slightly smaller than the area which is taken up by encoded information 2c on a label 2a. All that counts is to ensure that such information is not destroyed or distorted by heat during bonding of a label 2a to the adjacent end portions of two films at the splicing station 60.

Figure 3:
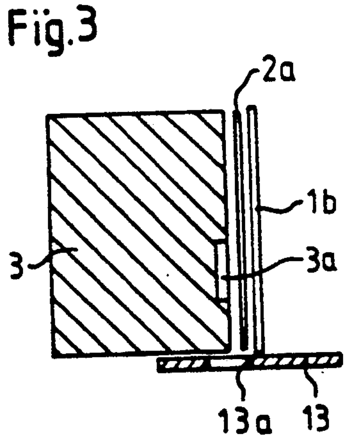
FIG. 3 is a sectional view substantially as seen in the direction of arrows from the line III—III of FIG. 2, and further showing the means for separating successive foremost labels of the train of labels from next-following labels as well as the position of a web and a label relative to the label-contacting surface of the sealing member.

The apparatus further comprises the aforementioned severing device 13 in the form of a knife which is adjacent the splicing station 60 and is actuatable in response to signals from the detector 15 to sever the train 2 of labels 2a behind the foremost label of the train when such foremost label has advanced to an optimum position for bonding to a pair of films which are then disposed end-to-end or close to such positions. The severing device 13 has a window 13a bounded in part by a cutting edge which severs the train 2 of labels behind the foremost label 2a when the knife is caused to move in a direction to the left, as seen in FIG. 3. The window 13a is sufficiently large to permit successive labels 2a to pass therethrough on their way to the splicing station 60.

Figure 4:
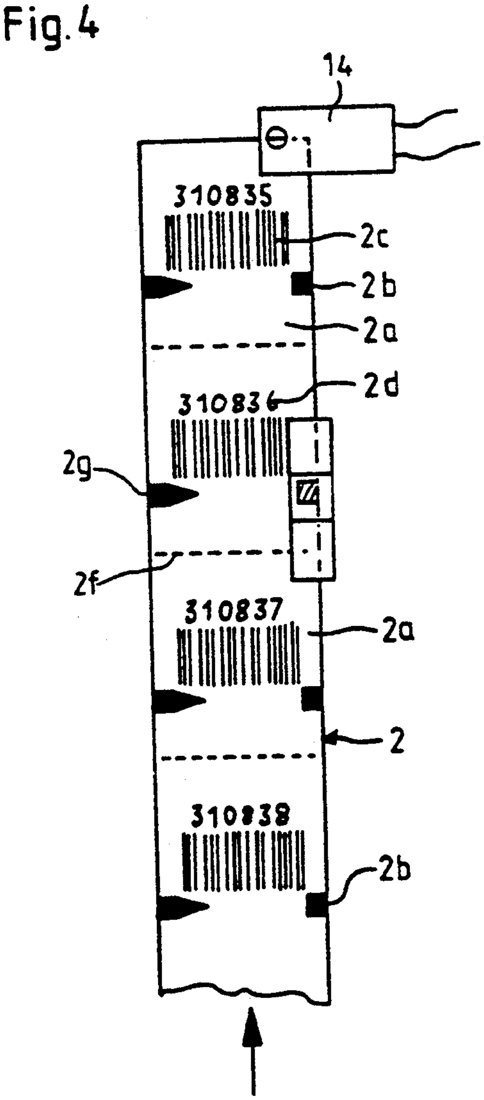
FIG. 4 is a plan view of a portion of a train of coherent labels which bear encoded and other information, and of two detectors one of which monitors the front ends of successive foremost labels and the other of which monitors additional information which is used to generate signals to operate the separating means.
Figure 5:
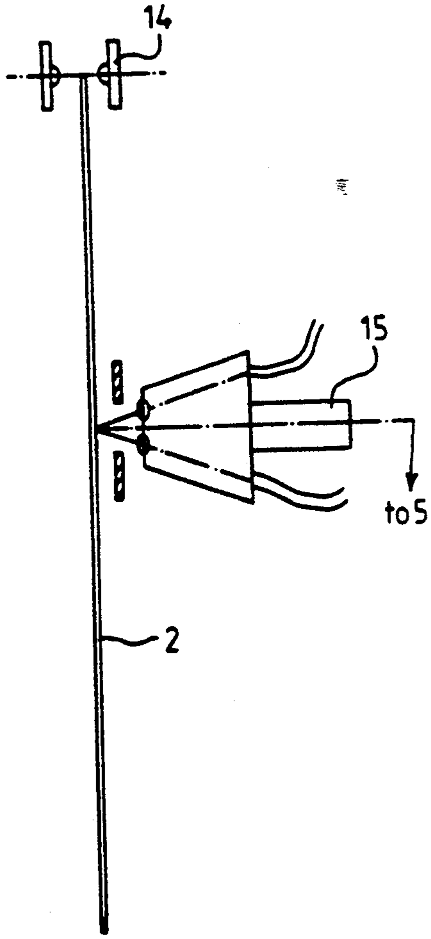
FIG. 5 is a view as seen from the left-hand side of FIG. 4.

FIGS. 4 and 5 show a forked photoelectronic detector 14 with a radiation source at one side and a signal generating transducer at the other side of the path for labels 2a on their way toward the splicing station 60. This detector monitors the leading edges (front ends) of successive labels 2a and transmits signals to the controls for the motor 5, i.e., to the means for transporting labels toward the splicing station 60. The detector 14 operates in the non-actinic range and is capable of detecting the presence of light-transmitting labels. The aforementioned detector 15 is installed slightly behind the detector 14 (as seen in the direction of arrow 17) and monitors the aforediscussed additional encoded information 2b. The detector 15 is also operative in the non-actinic range. Radiation which issues from the radiation source of the detector 15 impinges upon successive indicia 2b, and the transducer of the detector 15 transmits signals to the controls for the motor (not shown) which moves the severing device 13 relative to the train 2 of labels 2a.

The mode of operation of the apparatus of FIG. 1 is as follows:

The trailing end 1a' of the film 1a is assumed to be located at the splicing station 60 so that the rear edge of the trailing end 1a' is substantially midway between the marginal portions of the train 2 of labels 2a in the guide means 16. The leader 1b' of the film 1b is trimmed and the film 1b is advanced in the direction of arrow 18 so that the trimmed leader 1b' abuts or is located only slightly behind the trailing end 1a' of the film 1a. The presence of a narrow gap between the end portions of the films 1a, 1b at the splicing station 60 is acceptable; however, it is preferred to avoid an overlapping of the trailing end 1a' by the leader 1b' or vice versa. The means (not shown) for monitoring the progress of the film 1b in the direction of arrow 18 can be readily designed in such a way that the leader 1b' does not advance beyond the trailing end 1a'.

The foremost label 2a of the train 2 of labels then assumes the illustrated position, i.e., it is located at a certain distance (e.g., one or more centimeters or one or more millimeters) away from the splicing station. This ensures that information which is encoded on the foremost label 2a is not affected by heat which is radiated by the sealing member 3. The foremost label 2a of the train 2 of labels is also maintained in such retracted position during joint movement of freshly joined films 1a, 1b in the direction of arrow 18, namely toward a winding station where the strip consisting of a number of successive films is convoluted onto the core of a reel in a manner well known from the art and not forming part of the present invention.

When the train 2 of labels 2a in the path which is defined by the guide means 16 is at a standstill, the encoded information 2c on one of the labels is disposed immediately beneath the path of oscillatory or pendulum movement of the reader 6 with the arm 7. If the arm 7 is caused to perform a single back-and-forth movement about the axis of the pivot member 7a (such axis is parallel to the bars of encoded information 2c and to the direction which is indicated by arrow 17), this results in two scanning operations, i.e., the reader 6 can decode the adjacent information 2c twice in order to ensure that at least one of these readings will result in accurate decoding and transmission of appropriate signals to a printer for envelopes which are to receive films and prints with images of frames on the respective films.

If the signals which are generated during back and forth movements of the reader 6 across the path for the labels 2a on their way toward the splicing station 60 are not identical, or if either of these signals is not compatible with the previously transmitted signal, the train 2 is moved forwardly or backwards through a relatively short distance (e.g., one or more tenths of one millimeter in or counter to the direction which is indicated by the arrow 17) so as to present the information 2c beneath the path of oscillatory movement of the reader 6 in a different position for decoding and for transmission of an appropriate signal to the printer for envelopes. As shown in FIG. 1, the labels 2a of the train 2 are numbered consecutively so that the decoded information must be identical with the information which was decoded during scanning of a preceding label 2a plus or minus one, depending upon whether the number on a preceding label is higher or lower than the number on the next-following label. A comparison of successively decoded information renders it possible to ascertain whether or not the reader 6 has transmitted proper information.

The train 2 of labels 2a can be moved forwardly or backwards until the reader 6 transmits acceptable information which is compatible with information on the preceding label, or until the reader has completed a preselected number of movements transversely of the path of advancement of labels toward the splicing station 60. The reader 6 is moved back and forth in directions which are indicated by arrow 21 while the films advance in the direction of arrow 18, namely while the film 1b advances past the sealing member 3 so that its trailing end reaches the splicing station 60. The foremost label 2a in the guide means 16 remains in the illustrated retracted position until the trailing end of the film 1b reaches the splicing station 60 and until the leader of the next-following film (not shown) arrives at this station. The foremost label 2a (bearing the unencoded information "123452") is then conveyed into the splicing station 60 so that it properly overlaps the trailing end of the film 1b and the leader of the next-following film. The sealing member 3 is thereupon lowered to bond the label 2a bearing the information "123452" to the film 1b and to the next-following film, and the severing device 13 is actuated in response to a signal from the detector 15 to separate the foremost label 2a (namely the label at the splicing station 60) from the next-following label 2a of the train 2. Severing of the train 2 is followed by retraction of the train 2 so as to maintain the foremost label of the remainder of the train away from the sealing member 3 during transport of the film 1b and of the next-following film past the splicing station 60. When the retracting step by the transporting means 4, 5 is completed, the encoded information on the label 2a bearing the unencoded information "123454" is located exactly beneath the path of pendulum movement of the reader 6.

The apparatus of FIG. 1 is located behind or past an apparatus which removes films from cassettes and supplies removed films into the path for movement in the direction of arrow 18. The printer and the supply of envelopes are disposed in or adjacent such film removing apparatus and the film which is located upstream of the splicing station 60 must be identified by encoded information corresponding to that to be applied to the respective envelope in the film removing apparatus. The reader 6 transmits information to the printer (or to a perforating mechanism which operates with a set of needles to apply the information into the envelopes) which applies the thus received information to the respective envelope. Such application of information takes place subsequent to a comparison of decoded information with previously decoded information (on the preceding label) in order to ascertain whether or not the difference between successively decoded information equals one. Apparatus which can remove films from cassettes are disclosed in numerous United States Letters Patent of the assignee of the present application. Reference may be had, for example, to U.S. Pat. No. 4,621,970 to Würfel et al. and to U.S. Pat. No. 4,732,278 to Zangenfeind et al.

The detector 14 transmits signals which are used to operate the transporting means 4, 5 in order to ensure that the foremost label 2a of the train 2 of labels is properly delivered into the splicing station 60 in raised position of the sealing member 3 and while the station 60 accommodates the trailing end of a preceding film and the leader of the next-following film in optimum positions to be joined by a label.

An important advantage of the improved method and apparatus is that the encoded information cannot be distorted or otherwise damaged or erased prior to decoding by the reader 6. This is due to the fact that the decoding takes place before the labels 2a reach the splicing station 60. Therefore, heat which is radiated by the sealing member 3 cannot affect the encoded information 2c, any other information on the labels 2a and/or other desirable characteristics of the labels ahead of the station 60.

Another advantage of the improved method and apparatus is that the results of decoding are much more reliable than in heretofore known apparatus, even if one disregards the novel feature that the decoding takes place ahead of the splicing station 60. Thus, the reader 6 completes several passes across the adjacent encoded information 2c before the respective label 2a advances beyond the plane of pendulum movement of the arm 7 and reader 6. This enables the reader 6 to complete several successive decoding operations, if necessary after shifting of the adjacent label 2a in or counter to the direction of arrow 17 after each pass, to thus reliably decode the information on the adjacent label and reduce the likelihood of application of improper information to the corresponding envelope. The controls of the improved apparatus can include means for generating an audible, visible and/or otherwise detectable signal when the freshly decoded information is not compatible with the previously decoded information, e.g., when the difference between successive serial numbers is zero or more than one.

A printer or marking unit which can receive signals from the reader 6 of the improved apparatus and serves to apply corresponding information to envelopes for sections of photographic films and prints is disclosed, for example, in commonly owned U.S. Pat. No. 4,073,588 to Zangenfeind et al.

An apparatus which collates prints and related sections of photographic films and inserts the prints and film sections into envelopes is disclosed in commonly owned U.S. Pat. No. 4,115,981 to Hell et al.

Advancing units which can be used to advance films toward and beyond the splicing station in the apparatus of the present invention are disclosed in commonly owned U.S. Pat. No. 4,046,614 to Zahn et al. and in commonly owned U.S. Pat. No. 4,080,242 to Komenda et al.

The recess 3a in the label-contacting surface of the sealing member 3 exhibits the advantage that the encoded information 2c (and/or any other information which is overlapped by the recess 3a in the lowered position of the sealing member) is not likely to be distorted or destroyed during bonding of labels 2a to the respective pairs of films. The dimensions of the recess 3a are selected in such a way that the area of the label-contacting surface at the underside of the sealing member 3 still suffices to ensure the establishment of a reliable bond between a label 2a at the splicing station 60, the trailing end of a film to the right of the station 60, and the leader of a film to the left of this station. This is desirable and advantageous because the encoded information 2c is normally decoded again in the copying machine (e.g., in a roll copier) which makes prints of images of film frames and wherein the decoding of information 2c is necessary or desirable for the application of such information to the rear sides of the prints.

A further important advantage of the improved method and apparatus is that defective encoded information 2c (e.g., information which is defective for reasons other than overheating of the respective labels 2a) can be detected ahead of the splicing station 60 and all necessary corrective undertakings can be carried out to ensure that the identification of each envelope will correspond to that of the respective film and the respective prints.

Still another important advantage of the improved method and apparatus is that the decoding of information 2c (including repeated decoding of such information) takes place while the train 2 of labels 2a is at a standstill. This enhances the accuracy of the decoding operation without creating a bottleneck because decoding or repeated decoding takes place while the sealing member 3 is in the process of affixing a label to corresponding films and/or while the films are being advanced in the direction of arrow 18, i.e., the intervals between successive splicing operations need not be made longer for the sole purpose of permitting renewed or repeated decoding of information on the labels ahead of the splicing station.

Figure 6:
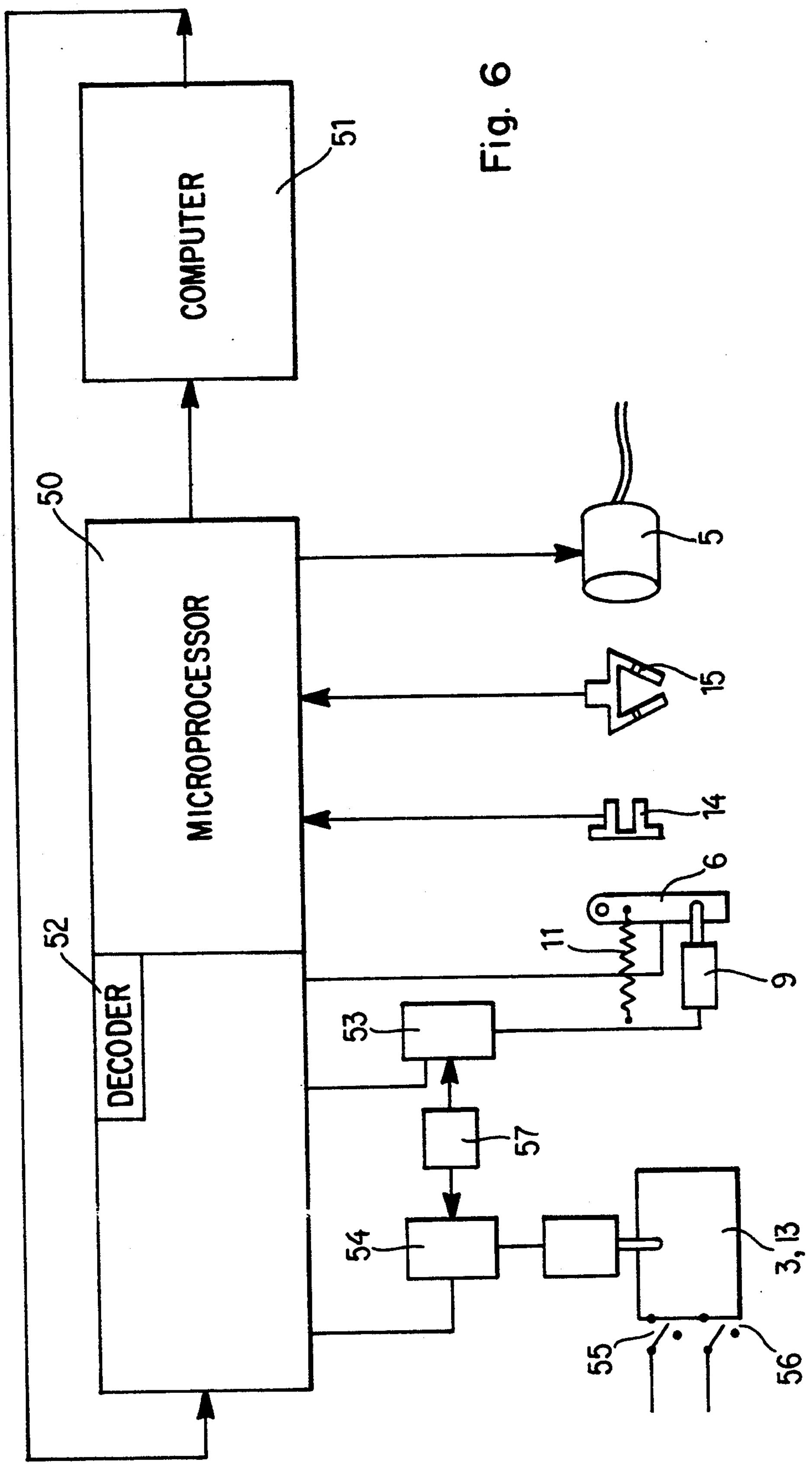
FIG. 6 is a diagrammatic view of the controls in the apparatus of FIG. 1.

FIG. 6 shows the controls for the apparatus of FIG. 1. A microprocessor 50 (e.g., of the type 8031 produced by INTEL) controls the movements of the motor 5 for one of the advancing rolls for the train 2 of labels 2a, the movemenets of the motor 9 which cooperates with the spring 11 to move the reader 6 across the path of movement of labels 2a in the guide means 16, and the movements of a motor 57 for the sealing device 3 and severing device 13. The microprocessor 50 is connected with the main computer of the copying machine which embodies the improved apparatus (e.g., a computer of the type 8085 produced by INTEL), and with a decoder 52 of information which is supplied by the reader 6.

The microprocessor 50 receives signals from the forked photoelectronic detector 14 and from the reflection type photoelectronic detector 15. This microprocessor controls a valve 53 for the flow of hydraulic or pneumatic fluid to and/or from the unit 9, and a valve 54 which controls the flow of hydraulic or pneumatic fluid to and/or from the motor 57 for the sealing device 3 and severing device 13. Two electric limit switches are located in the path of movement of the sealing device 3 and/or severing device 13 to generate signals in the respective end positions of 3 or 13, and such signals are transmitted to the microprocessor 50. At the same time, the decoder 52 furnishes to the microprocessor 50 signals pertaining to the information (2c) which is supplied by the reader 6; such signals are transmitted when the information which is detected by the reader 6 is acceptable or plausible, e.g., when the serial number (information 2c) denoted by the signal from 6 departs by one from the serial number of the preceding label 2a.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. Apparatus for joining successive webs of a series of discrete elongated webs of photographic material end-to-end by means of successive labels bearing encoded information denoting consecutive identifying indicia, comprising means for advancing successive webs of said series along a predetermined path so that the trailing ends of successive webs are adjacent the leaders of next-following webs in a predetermined portion of said path; means for affixing successive labels to the trailing ends of successive webs and to the leaders of the next-following webs in said portion of said path; means for decoding information on successive labels prior to affixing of labels to the webs; a source of supply of envelopes, one for each of the labels; and means for receiving decoded information from said decoding means and for applying the thus received decoded information to the respective envelopes.

2. The apparatus of claim 1, further comprising means for transporting successive labels along a second path in a direction toward said portion of said predetermined path, said decoding means being adjacent said second path.

3. The apparatus of claim 2, wherein said transporting means includes means for transporting the labels in stepwise fashion and means for guiding the labels in said second path.

4. The apparatus of claim 2, wherein said decoding means includes a reader and means for moving said reader substantially transversely of said second path.

5. The apparatus of claim 4 for joining webs by means of labels bearing encoded information in the form of bars extending in said direction, the labels in said second path being disposed in a predetermined plane and said moving means including means for moving said reader along a third path which is substantially parallel to said plane.

6. The apparatus of claim 5, wherein said moving means includes an elongated arm pivotable about an axis which is substantially parallel to said direction and means for pivoting said arm, said reader being provided on said arm and being remote from said axis.

7. The apparatus of claim 6, wherein said pivoting means includes means for turning said arm in a first direction and means for turning said arm in a second direction counter to said first direction.

8. The apparatus of claim 7, wherein one of said turning means includes a cylinder and piston unit.

9. The apparatus of claim 7, further comprising means for operating said transporting means to transport the labels along said second path during or subsequent to each change of direction of turning of said arm about said axis.

10. The apparatus of claim 9, wherein said transporting means is operative to transport the labels through increments in the range of millimeters or fractions of millimeters during or subsequent to each change of direction.

11. The apparatus of claim 2, wherein said transporting means includes means for conveying labels in and counter to said direction, said affixing means including means for heating the labels and further comprising means for operating said conveying means to move the labels counter to said direction so as to move the foremost label in the second path away from said affixing means during advancement of an affixed label away from said portion of said predetermined path.

12. The apparatus of claim 11, wherein the labels in said second path together form a train of coherent labels, and further comprising severing means operable to separate successive foremost labels of the train of labels from next-following labels upon entry of foremost labels into said portion of said predetermined path, said operating means being arranged to operate said conveying means to move the train of labels counter to said direction upon separation of successive foremost labels.

13. The apparatus of claim 11, wherein said conveying means is operable to move the labels counter to said direction through distances in the range of a few centimeters or fractions of one centimeter.

14. The apparatus of claim 2 for joining webs by means of labels bearing additional information denoting the distance of such additional information from the front ends of the respective labels, the labels in said second path together forming a train of coherent labels and further comprising signal responsive severing means operable to separate successive foremost labels from next-following labels upon entry of foremost labels into said portion of said predetermined path, and detector means adjacent said second path and arranged to transmit to said severing means signals in response to detection of additional information on successive labels of said train of labels.

15. The apparatus of claim 2, further comprising detector means including means for monitoring the front ends of successive labels in said second path and for generating signals to operate said transporting means.

16. The apparatus of claim 1, wherein said affixing means includes a heated sealing member having a label-contacting surface and at least one recess in said surface, said recess being positioned to overlie encoded information on the label in said portion of said path.

* * * * *